United States Patent [19]

Horiki

[11] 4,152,548
[45] May 1, 1979

[54] IMMEDIATE RING-BACK CONTROL SYSTEM FOR TIME-DIVISION TELEPHONE EXCHANGE

[75] Inventor: Akira Horiki, Yokohama, Japan

[73] Assignee: Hitachi, Ltd., Japan

[21] Appl. No.: 860,114

[22] Filed: Dec. 13, 1977

[30] Foreign Application Priority Data

May 16, 1977 [JP] Japan .................................. 52-55302

[51] Int. Cl.² ........................................... H04M 3/02
[52] U.S. Cl. ........................... 179/18 HB; 179/15 BY
[58] Field of Search ...................... 179/18 HB, 15 BY

[56] References Cited

U.S. PATENT DOCUMENTS 3,378,643  4/1968  Goeller ........................... 179/18 HB Primary Examiner—William C. Cooper
Attorney, Agent, or Firm—Craig & Antonelli

[57] ABSTRACT

An immediate ring-back control system for a time-division telephone exchange includes a time-division switching network of a time switch-space switch-time switch (T-S-T) system. An incoming time switch accommodates multi-channel interrupted ring-back tones (IRBT's) which are generated by a tone generator in a time-multiplexed manner, each of which has a different interruption phase. The interrupted ring-back tone having a phase starting from a tone-sending period is selected from the multi-channel interrupted ring-back tones (IRBT's) by an immediate ring-back control circuit provided in a time-division switch driving circuit (SDC) at the time of connection of the ring-back tone to a calling subscriber, and a channel number corresponding to the phase of the interrupted ring-back tone is stored in a control memory or a time slot memory associated with the time switch, so that the transmission of the interrupted ring-back tones to a calling subscriber can be started from a mark portion thereof.

6 Claims, 3 Drawing Figures

IMMEDIATE RING-BACK CONTROL SYSTEM FOR TIME-DIVISION TELEPHONE EXCHANGE

LIST OF PRIOR ART REFERENCES (37 CFR 1.56(a))

The following references are cited to show the state of the art:
1. U.S. Pat. No. 3,350,508
2. Bell Laboratories Record, Vol. 51, No. 8, pp 226–232, September 1973 entitled "No. 4 ESS-Long Distance Switching for the Future" written by Mr. G. Douglas Johnson.
3. International Switching Symposium 74, pp 212/1–212/5 entitled "An Experimental Digital Local System" written by Mr. H. S. McDonald

BACKGROUND OF THE INVENTION

The present invention relates to a time-division telephone exchange and more particularly to an immediate ring-back control system for a time-division telephone exchange, which allows a calling subscriber to receive a ring-back tone having no phase delay selected out of plural ring-back tones having various phases at the time of connection of ring-back tone to the calling subscriber so that the calling subscriber may receive the ring-back tone immediately after the calling subscriber has dialled a called telephone number.

It is desirable to shorten the period of time during which a calling subscriber has dialled a telephone number, a speech path has been established between the calling subscriber and the called subscriber, and the ring-back tone is received by the calling subscriber, that is, to reduce what is known as post dialling delay. The post dialling delay time includes, in addition to a period of time for establishing the speech path, the delay time from the beginning of the ready state of calling the called subscriber in a terminating office to the time of the transmission of the ring-back tone to the calling subscriber. This delay time has a significant influence on telephone service. For example, if the ring-back tone is sent intermittently with one-second mark and two-seconds space, a maximum of two-seconds delay time may be required before the ring-back tone is sent to the calling subscriber.

In order to reduce such delay time to improve the serviceability, a first ringing control system has been heretofore used in which a continuous ringing signal is sent to the called subscriber once for a predetermined period of time after the establishment of the speech path and the continuous ring-back tone is sent to the calling subscriber, and thereafter a periodic intermittent ringing signal and ring-back tone are sent. However, since the prior art ring-back tone sending system requires a first ringing control circuit for each of the ring-back tone trunk circuits and ringing trunk circuits provided therein, it has a drawback in that the cost of the ring-back tone and ringing trunk circuit is high.

SUMMARY OF THE INVENTION

It is an object of the present invention to provide an economical immediate ring-back control system which improves serviceability by providing in a time-division switch driving circuit an immediate ring-back control circuit which may be constituted of a simple circuit utilizing the characteristics of a time-division telephone exchange.

The characteristics of the time-division telephone exchange referred to above are the ability of establishing a branch connection of a single information source to a number of channels, the ability of economically attaining a large theoretical lattice, and the ability of centrally accommodating audible signal tones including the ring-back tone in a single highway. These objectives can be achieved by the utilization of the time switch.

According to the present invention, a tone generator which generates a digital coded ring-back tone in a time-multiplexed fashion is accommodated in an incoming highway of a time-division switching network, and the tone generator produces a plurality of interrupted ring-back tones each having a different interruption phase, and when a time-division speech path from the calling subscriber to the tone generator is established, an interrupted ring-back tone (IRBT) having a phase which is ON in that time band is selected by an immediate ring-back control circuit (IRBCTL) provided in a time-division switch driving circuit and the channel number of the selected interrupted ring-back tone is stored in a control memory which corresponds to the time switch. In this manner, the ring-back tone can be sent to the calling subscriber without delay after the connection of the ring-back tone.

DETAILED DESCRIPTION OF THE PREFERRED EMBODIMENTS

The preferred embodiments of the present invention will be explained with reference to the drawings.

Figure 1:
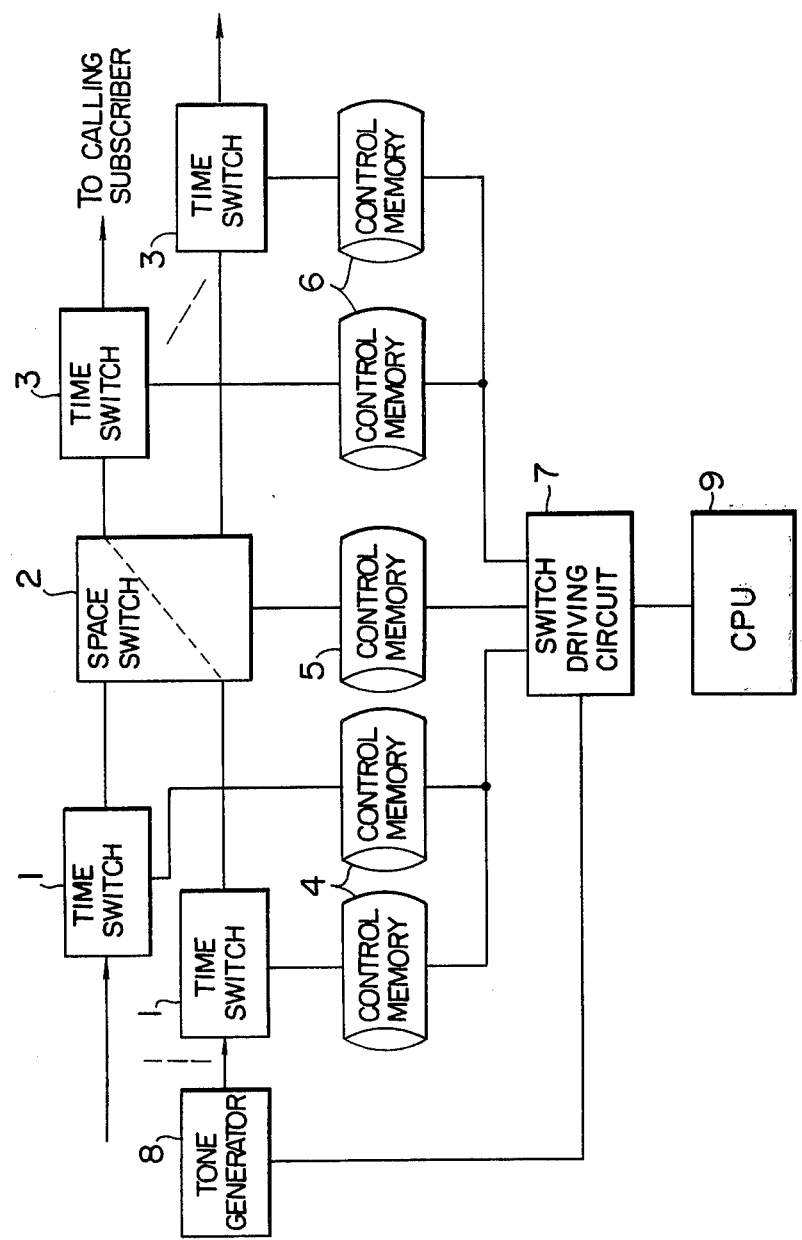
FIG. 1 shows a block diagram of a time-division telephone exchange to which the present invention is applied.

FIG. 1 shows a block diagram of a time-division telephone exchange to which the present invention is applied. It shows only that portion of the circuit which relates to sending of the ring-back tone. In FIG. 1, numerals 1 and 3 denote time switches (TS's) which effect time switching by interchange of time slots using a buffer memory, numeral 2 denotes a space switch (SS) for effecting space switching in each time slot, and it forms a time-division switching network in a time switch-space switch-time switch system. Numerals 4, 5 and 6 denote control memories or time slot memories (CTLM's) for controlling the time switch 1, the space switch 2 and the time switch 3, respectively, and numeral 7 denotes a time-division switch driving circuit (SDC) for rewriting the contents of the control memories 4 to 6 in response to an instruction from a central processor unit (CPU) 9. The general operation of establishing a time-division switching network is accomplished in a known manner on the basis of stored program control. (For example, see No. 4 ESS-Long Distance Switching for the Future: Bell Laboratories Record, Vol. 51, No. 8, pp 226–232, Sept. 1973.) Numeral 8 denotes a tone generator (TNG) for digitally generating various audible signal tones which include n differently-phased interrupted ring-back tones each having an interruption phase shifted by 1/n period to each other. The tone generator can be readily realized by the present digital technique (e.g. See a technical report disclosed in International Switching Symposium 74, pp 212/1–212/5, entitled "An Experimental Digital Local System").

Figure 2:
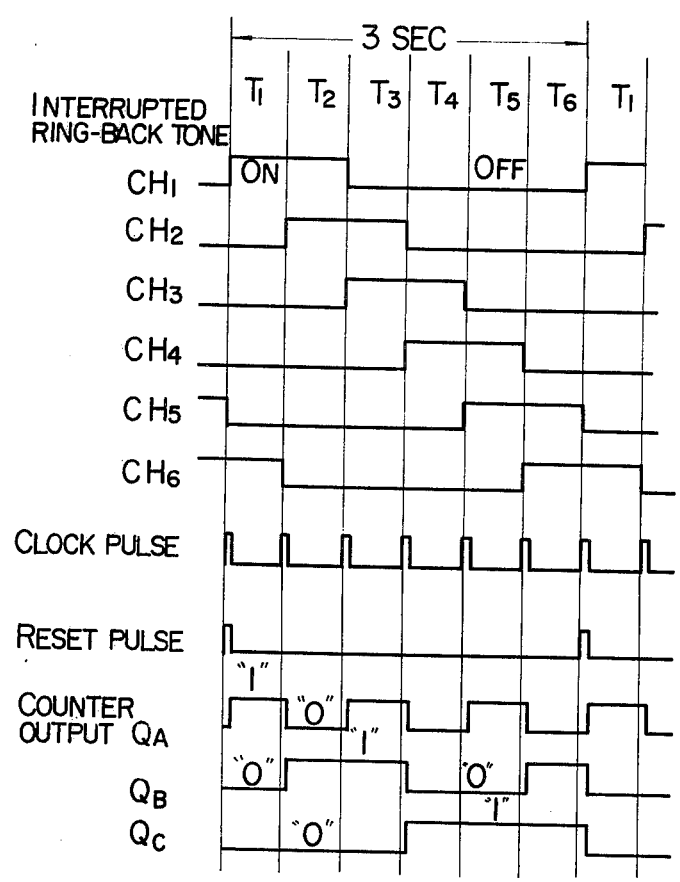
FIG. 2 shows a time chart for illustrating the operation of selection of phase of ring-back tones.

FIG. 2 shows a time chart for illustrating the operation of selection the phase of the ring-back tone, in which the period of the ring-back tone is equal to a period of three seconds consisting of a one-second audible period (ON) during which there is an audible tone and two-seconds silent period (OFF) during which there is no tone and six (n=6) different ring-back tones each having a phase shifted by 0.5 seconds to each other are generated in channels 1 to 6.

Six different ring-back tone codes generated by the tone generator 8 are supplied to the time switch 1 together with other audible signal tones, that is, dial tone, busy tone or the like, and stored in associated addresses of the buffer memory.

When the ring-back tone is to be sent to the calling subscriber, channels in the time-division switching network are matched in a well-known manner and the time slot number for the switches used in the connection and the position of crosspoint of SS2 are determined. In accordance with the result thereof, the contents of the addresses to said channels of the time-division switching network of the control memories 4 to 6 are rewritten by the CPU 9 through the time-division switch driving circuit 7. In this case, the channel number of a desired ring-back tone having no delay generated by the tone generator 8 is stored in the control memory (as will be described in detail hereinafter). That is, the address to be read out at the selected time slot is specified. The ring-back tone code read out of the time switch 1 is thereafter sent to the calling subscriber through the space switch 2 and the time switch 3.

Figure 3:
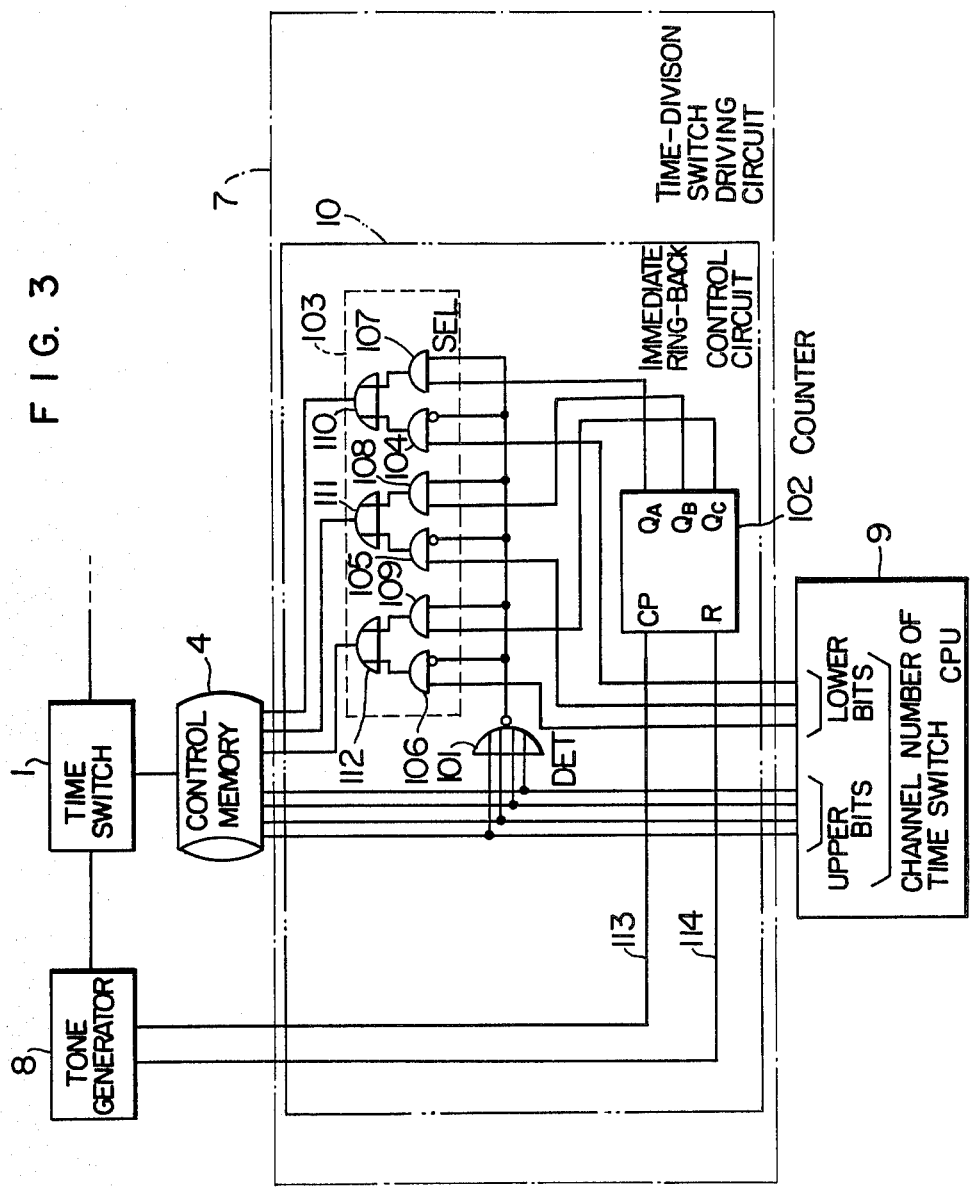
FIG. 3 shows a circuit diagram of one embodiment of an immediate ring-back control circuit of the present invention.

The feature of the present invention resides in the immediate ring-back control circuit (IRBCTL) included in the time-division switch driving circuit 7. FIG. 3 shows a circuit of one embodiment thereof.

Referring to FIG. 3, the operation of the immediate ring-back control circuit 10 is explained. In FIG. 3, upper order bits of the channel number of the TS1 specified by the CPU 9 is sent out of the CPU 9 to the control memory 4 through the immediate ring-back control circuit 10. Numeral 101 denotes a detection circuit (DET) which receives the upper order bits of the channel number of the tone generator 8 stored in the control memory 4 to identify the ring-back tone connection. FIG. 3 shows an example where both the tone generator 8 and the time switch 1 have 128 (=$2^7$) channels. The six different ring-back tones generated by the tone generator 8 are allocated to the channel numbers 1 to 6 of the TS$_1$ with the channel numbers 0 and 7 being left unused. In case of the ring-back tone connection, if it is assumed that the four upper order bits of the channel number stored in the control memory 4 are all zero (i.e. 0000000 to 0000111 for a 7-bit binary code), the ring-back tone connection can be readily identified. In case of the connection other than the ring-back tone connection, at least one of the four upper order bits of the channel number of the TS$_1$ specified by the CPU 9 is "1". Thus, the detection circuit 101 may be constructed by a four-input NOR gate as shown in FIG. 3. Numeral 102 denotes a scale-of-six counter (CNT) for indicating time band information for T$_1$ to T$_6$ shown in FIG. 2. It is stepped for each 0.5 second to complete one cycle in three seconds. Since the counter 102 must be operated in synchronism with the tone generator 8, it receives clock pulses having a 0.5 second period and an intialization pulse (or reset pulse) having a 3-second period. Numeral 113 denotes a clock pulse line and 105 denotes an initialization pulse line. A pulse is received from the clock pulse line 113 whenever the time bands T$_1$ to T$_6$ are switched, and a pulse is received from the initialization pulse line whenever the time band T$_6$ is switched to the time band T$_1$. The counter 102 is stepped sequentially by the clock pulse from the clock pulse line 113 and reset to the initial value (001) when the pulse is received from the initialization pulse line 114. Accordingly, the output of the counter 102 ($Q_CQ_BQ_A$) repeates the six different output states (001), (010), (011), (100), (101), (110) for the time bands T$_1$ to T$_6$.

Numeral 103 denotes a selector (SEL) for determining three lower order bits of the channel number of the tone generator 8 to be stored in the control memory 4. When the audible tone other than the ring-back tone (such as dial tone or busy tone) is connected, since the four upper order bits of the channel number are not all zero, the output of the DET 101 is OFF and AND gates 104 to 106 in the selector 103 are ON so that the three lower order bits of the channel number specified by the CPU 9 are sent to the control memory 4 through OR gates 110 to 112. As a result, the entire channel number specified by the CPU 9 is stored in the control memory 4. On the other hand, when the ring-back tone is connected, the output of the detector circuit 101 is ON, the AND gates 104 to 106 in the selector 103 are OFF and the AND gates 107 to 109 are ON so that the content of the counter 102 is stored in the control memory 4 through the OR gates 110 to 112. At the same time, the four upper order bits of the channel number specified by the CPU 9 are stored in the four upper order bit address of the control memory independently of the type of connection.

If a request for the connection of the ring-back tone occurs in the time band T$_1$, the detection circuit 101 and the selector circuit 103 operate so that the content CH$_1$ of the counter 102 corresponding to the time band T$_1$ is stored in the control memory 4 and the interrupted ring-back tone is sent at the phase of the channel number CH$_1$ from that time point. As seen from FIG. 2, since the ring-back tone channel CH$_1$ has a phase to send an audible signal tone from the time band T$_1$ to T$_2$, if the channel number CH$_1$ is stored in the control memory 4 in the time band T$_1$, the time switch 1 will pass the audible signal tone of the duration equal to at least 0.5 second and at most one second from that time point in that time slot. Similarly, when requests for the connection of the ring-back tone occur in the time band T$_2$ to T$_6$, the channel numbers CH$_2$ to CH$_6$ are stored in the control memory 4 from the counter 102 through the selector 103 and the ring-back tone is thereafter sent at the respective phase.

As described hereinabove, the present invention is characterized by the immediate ring-back control circuit wherein the tone generator generates the multiphase ring-back tone which is stored in the first stage time switch of the time-division switching network, and when the ring-back tone is connected the time-division switch driving circuit selects the ring-back tone having the most appropriate phase to the selected time band and the channel number of the tone generator corresponding to that phase is stored in the control memory of the first stage time switch. In this manner, the post dialing delay of ring-back tone transmission to a calling subscriber can be reduced in an economical way by merely adding a small amount of hardware as a common circuit.

I claim:

1. In a time-division telephone exchange comprising:
a time-division switching network of a time switch-space switch-time switch system, said switching network including a plurality of incoming time switches and a plurality of outgoing time switches;
a central processor unit;
a plurality of control memories, each of which is associated with one of said incoming and outgoing time switches; and
a time-division switch driving circuit, said control memories being controlled by said central processor unit through said switch driving circuit,
the improvement further comprising an immediate ring-back control system comprising:
(a) a tone generator associated with one of said incoming time switches and generating a plurality of encoded digital signals of multi-channel interrupted ring-back tones, each of which has a different interruption phase and is accommodated in said incoming time switch, and
(b) an immediate ring-back control circuit comprising: a counter circuit for counting synchronizing pulses and reset pulses supplied from said tone generator and generating encoded digital signals of channel numbers corresponding to said multi-channel interrupted ring-back tones; and a transfer circuit for transferring said channel number digital signals to the control memory associated with said incoming time switch in response to a command signal supplied thereto from said central processor unit through said switch driving circuit, said synchronizing pulses being generated at the beginning of each of said multi-channel interrupted ring-back tones and said reset pulses being generated at the time of completion of all of said different interruption phases.

2. An immediate ring-back control system according to claim 1, wherein said immediate ring-back control circuit is provided in said time-division switch driving circuit, and said command signal from said central processor unit includes upper order bits and lower order bits, the number of said lower order bits being equal to that required for the number of the phase of said ring-back tones, and said transfer circuit comprises:
a detector circuit responsive to the content of said upper order bits and detecting a period of time for connection of said ring-back tone;
a selector circuit responsive to an output of said detector circuit and transferring an output of said counter circuit to said control memory when the output of said detector circuit indicates the connection of said ring-back tone, and transferring said lower bits to said control memory when the output of said detector circuit does not indicate the connection of said ring-back tone.

3. An immediate ring-back control system according to claim 2, wherein said detector circuit comprises a NOR gate having a number of inputs equal to the number of said upper bits.

4. An immediate ring-back control system according to claim 2, wherein said selector circuit comprises a group of OR gates each having a first input connected to one of outputs of a first group of AND gates which receive inverted output of said detector circuit and said lower order bits, and a second input connected to one of outputs of a second group of AND gates which receive the output of said detector circuit and the output of said counter circuit.

5. An immediate ring-back control system according to claim 2, wherein said counter circuit may generate a certain binary number having a necessary number of bits for a channel number of said interrupted ring-back tones corresponding to the channel number of the interrupted ring-back tone having a certain phase when one of said reset pulses is received, and thereafter may continuously generate a binary number having the same number of figures as said certain binary number whenever said synchronizing pulses are received.

6. In a time-division telephone exchange comprising:
a time-division switching network of a time switch-space switch-time switch system, said switching network including a plurality of incoming time switches, a plurality of outgoing time switches and a space switch provided between said incoming time switches and said outgoing time switches;
a plurality of control memories, each of which is associated with one of said switches, respectively, for controlling said switches according to the memory contents stored therein; and
a time-division switch driving circuit for transferring instructions applied thereto to the control memories so as to rewrite the contents of said control memories in accordance with the instructions thus transferred;
the improvement comprising an immediate ring-back control system including:
(a) a digital tone generator connected to one of said incoming time switches and operatively generating digital signals of multi-channel interrupted ring-back tones, synchronizing pulses and reset pulses, each of said interrupted ring-back tones having an audible period and a silent period constituting one cycle, and having a channel number in accordance with its own phase which is shifted by a certain period less than said audible period with respect to that of the others of said interrupted ring-back tones of adjacent phase so as to maintain an overlapping of audible periods of two ring-back tones with mutually adjacent phase, said synchronizing pulses being generated at the beginnings of said audible periods of the respective multi-channel interrupted ring-back tones, and said reset pulses being generated once for each cycle of said interrupted ring-back tones; and
(b) an immediate ring-back control circuit including:
a counter circuit for counting said synchronizing pulses after each generation of said reset pulses so as to detect the channel numbers of the ring-back tones in accordance with the result of counting of the synchronizing pulses and for generating encoded channel numbers of the thus-detected multi-channel interrupted ring-back tones; and
a transfer circuit for transferring said encoded channel numbers to said switch driving circuit so as to be written in said control memory associated with said one incoming time switch through said switch driving circuit, said encoded channel number representing a ring-back tone connection, so that the transmission of said interrupted ring-back tones to a calling subscriber can be always started from said audible period thereof.

* * * * *